United States Patent [19]

Furukawa

[11] Patent Number: 4,668,986
[45] Date of Patent: May 26, 1987

[54] MOTION-ADAPTIVE INTERPOLATION METHOD FOR MOTION VIDEO SIGNAL AND DEVICE FOR IMPLEMENTING THE SAME

[75] Inventor: Akihiro Furukawa, Tokyo, Japan
[73] Assignee: NEC Corporation, Japan
[21] Appl. No.: 727,028
[22] Filed: Apr. 25, 1985

[30] Foreign Application Priority Data

Apr. 27, 1984 [JP] Japan .................................. 59-85234

[51] Int. Cl.⁴ .............................................. H04N 7/12
[52] U.S. Cl. ..................................... 358/136; 358/105
[58] Field of Search .............. 358/105, 133, 135, 136, 358/138; 375/27

[56] References Cited

U.S. PATENT DOCUMENTS 4,307,420  12/1981  Ninomiya et al. ................... 358/136
4,310,853  1/1982   Madson ........................... 358/138 X
4,460,923  7/1984   Hirano et al. ....................... 358/136

OTHER PUBLICATIONS

ICC '84 May 14–17, 1984 Proceedings, vol. 2, (pp. 527–1010), "Motion–Adaptive Interpolation for Videoconference Pictures".
"Motion Compensated Prediction for Inter–Frame Coding Systems", Image Technical Study Section, Electrocommunication Society, May 1978, by Ninomiya.

Primary Examiner—E. A. Goldberg
Assistant Examiner—Patrick W. Foster
Attorney, Agent, or Firm—Ostrolenk, Faber, Gerb & Soffen

[57] ABSTRACT

A motion-adaptive interpolation method for a motion video signal includes the steps of computing a representative motion vector of a moving object by using a certain number of motion vectors, and implementing a modification of the representative motion vector such that a variation of the representative motion vector at a present frame period with respect to the representative motion vector at a previous frame period is limited to a predetermined range, thus increasing the number of the frames per unit of time by using the modified representative motion vector. Further, a device for implementing the motion-adaptive interpolation includes motion estimation circuitry for evaluating an estimated motion of the motion video signal. The motion estimation circuitry has a function to compute the representative motion vector by using original motion vectors, a function to implement a modification of the representative motion vector so as to limit its variation of a present representative motion vector with respect to a previous one, and a function to create a motion vector for motion-adaptive interpolation. Thus, it is possible to provide an excellent smooth movement reproduction and high resolution in the moving area within the frame of the motion video signal.

18 Claims, 6 Drawing Figures

MOTION-ADAPTIVE INTERPOLATION METHOD FOR MOTION VIDEO SIGNAL AND DEVICE FOR IMPLEMENTING THE SAME

BACKGROUND OF THE INVENTION

The present invention relates to a method of applying motion-adaptive interpolation to a motion video signal e.g. a television signal to effect incremental operation of the number of frames such as televison scene by making use of motion information (motion vector) of a moving object. Specifically, the present invention relates to a method of effecting motion-adaptive interpolation by using a representative motion vector of which variation in respect to time lapse is reasonably limited. Further, the present invention relates to a device capable of producing an output such that a smooth-motion of a moving object is realized based on the motion-adaptive interpolation of missing frames.

Hitherto, in case where there is a need for compressing, to a great extent, a bit rate required for transmitting a motion video signal represented by a television signal, there has been employed a frame dropping scheme of transmitting frames of compressed volume obtained by dropping particular frames at a certain rate instead of transmission of all the frames. In this case, it is necessary to reproduce missing frames based on a synthesis operation by utilizing the transmitted frames on the side of a receiver. Namely, there arises a need for increasing the number of frames. As simple methods for meeting this need, there have been known a simple repetition method of repeating transmitted frames, and a linear interpolation method of effecting a linear operation based on picture signals spacially corresponding to frames adjacent to a missing frame etc.

However, the motion picture synthesized with the above-mentioned simple methods results in deteriorated picture quality such as, for example, lack in a smooth motion of a moving object (jerkiness), or degraded resolution in a moving area etc. To overcome such a deterioration, a motion-adaptive interpolation scheme has been proposed.

Various motion-adaptive interpolation systems have been developed. For instance, there is a system disclosed in ICC '84 LINKS FOR THE FUTURE IEEE International Conference on Communications May 14-17, 1984 Proceedings Volume 2 (pp. 527-1010). This system is such that a motion vector is obtained as unit of blocks each comprising a plurality of picture elements by using the frame adjacent to a missing frame, thus estimating a position of the moving object in the missing frame on the basis of the moving vector thus obtained. There is another system called a "gradient system" wherein a moving vector per units of picture elements is determined on the basis of a luminance gradient in each frame and a differential value between frames, thus estimating a position of a moving object in the missing frame based on the motion vector thus obtained. In addition, a rigid object motion approximation system has been developed with a view of lessening the occurrence of spacial discontinuity included within the interpolated picture, resulting from an erroneously-detected moving vector which does not correspond to an actual motion. For this purpose, the system is configured to remove an erroneously-detected motion vector among a group of motion vectors obtained with respect to a block or a picture element in a moving area by taking into account of an error per block with respect to various kinds of vectors, thereafter to estimate one motion vector (which will be called a "representative motion vector" hereinafter) which is representative of the motion of the moving area, thus shifting the entire moving area by using the representative motion vector, i.e., based on a rigid body motion approximation.

However, with the last-mentioned conventional system, when the number of motion vectors which do not correspond to an actual motion increases due to the influence of noises etc., the representative motion vector itself is erroneously estimated, with the result that there frequently occurs the case where the representative motion vector itself cannot correspond to the actual motion.

Figure 1A:
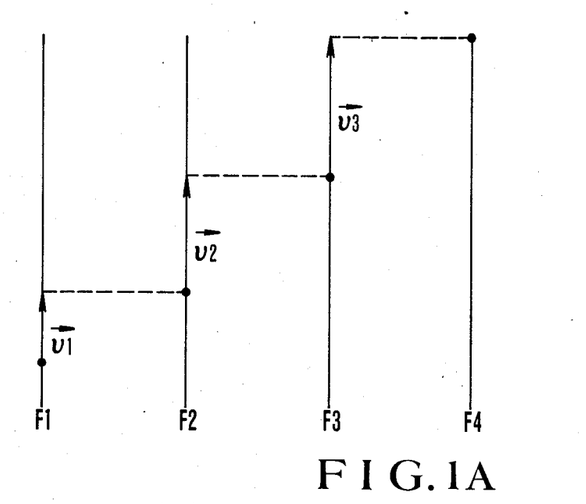
FIG. 1A is an explanatory view showing an example of a correctly detected motion vector of a moving object being accelerated.
Figure 1B:
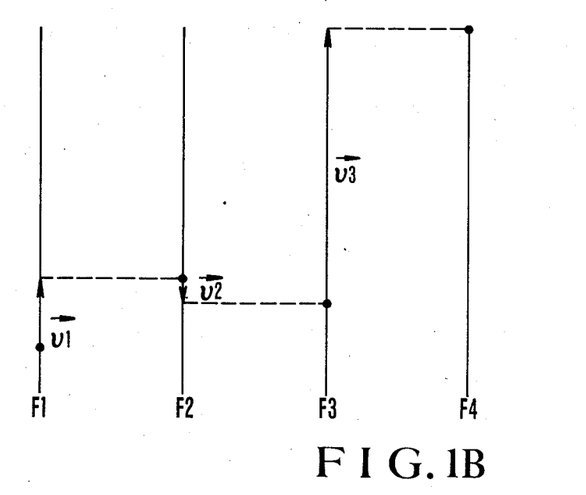
FIG. 1B is an explanatory view showing an example of an erroneously detected motion vector of a moving object being accelerated.

The drawbacks with this system will be described in detail in conjunction with FIGS. 1A and 1B. FIG. 1A shows an example of the case where the motion of a moving object is correctly estimated. Symbols $F_1$ to $F_4$ denote successive four frames wherein $v_1$, $v_2$ and $v_3$ denote representative motion vectors estimated between $F_1$ and $F_2$, $F_2$ and $F_3$, and $F_3$ and $F_4$. In this example, the moving object moves with its velocity increasing. In contrast, if noises increase in a picture signal, there frequently takes place the case where a representative motion vector is estimated with a failure to correspond to the actual motion as shown in FIG. 1B, even when this system is applied to the same picture. At this time, there coexist a frame (e./g. $F_1$) in which the representative motion vector is estimated in correspondence with the actual motion and a frame (e.g. $F_2$) in which the representative motion vector is erroneously estimated without corresponding to the actual motion. As a result, when an attention is paid to a time axis direction, the velocity of the moving object which is to principally gradually vary in succession is varied in a discontinuous manner and to a great extent. When an attempt is made to newly synthesize a frame e.g. between $F_2$ and $F_3$, although the resultant picture can preserve plane continuity in a moving area, it has the drawback that its motion lacks in continuity such that the direction of the representative motion vector $v_2$ is opposite to that of the correct representative motion vector e.g. in regard to $F_2$, with the result that non-smoothed motion is likely to be reproduced.

SUMMARY OF THE INVENTION

In view of the above, an object of this invention is to provide a motion-adaptive interpolation method for a motion video signal and a device for implementing the same which can eliminate the above-mentioned drawbacks encountered in the prior arts.

Another object of this invention is to provide an improved picture quality of an interpolated picture.

A further object of this invention is to realize a synthesized interpolated motion picture having both plane continuity in a moving area and continuity of a motion in a time axis direction.

A still further object of this invention is to provide an excellent smooth movement reproduction and high resolution in the moving area within a frame of a motion video signal.

According to the present invention, there is provided a motion-adaptive interpolation method for a motion video signal, the method comprising the steps of detecting an n number of motion vectors (n is a positive integer) of a moving object as units of a certain number of picture elements from two successive frames of the motion video signal, computing an m number of representative motion vectors (m is a positive integer: m<n) representative of motion of the moving object by using the n number of motion vectors, implementing a modification of the representative vector such that a variation of the representative motion vector at a present frame period with respect to the representative motion vector at a previous frame period is limited to a predetermined range, and increasing the number of the frames per unit of time by using the modified representative motion vector.

The motion-adaptive interpolation method may comprise the steps of detecting an n number of motion vectors of a moving object as units of a certain number of picture elements from two successive frames of the motion video signal, computing a frequency distribution of the n number of motion vectors, evaluating an m number of representative motion vectors (m<n) representative of motion of the moving object from the frequency distribution of the n number of the motion vectors, implementing a modification of the representative vector such that a variation of the representative motion vector at a present frame period with respect to the representative motion vector at a previous frame period is limited to a predetermined range, and increasing the number of the frames per unit of time by using the modified representative motion vector. The computing step may comprise the steps of computing a first occurrence frequency distribution of the n number of motion vectors at a present frame period, computing a second occurrence frequency distribution of the n number of motion vectors at a previous frame period, and computing linear combination of the first and second occurrence frequency distributions with respect to respective components, and the evaluating step may comprise the step of evaluating an m number of representative vectors (m<n) representative of motion of the moving object from the third occurrence frequency distribution.

According to the present invention, there is also provided a device for implementing motion-adaptive interpolation to motion video signal, the device comprising: motion vector detector means (15) for detecting an original motion vector of a moving object as a unit of a certain number of picture elements from two successive frames of the motion video signal; motion estimation means (16) for evaluating an estimated motion of the motion video signal, the motion estimation means having a first function to compute a representative motion vector of the moving object by using each original motion vector sequentially inputted from the motion vector detector means, a second function to implement a modification of the representative motion vector such that a variation of the representative motion vector at a present frame period with respect to the representative motion vector at a previous frame period is limited to a predetermined range, and a third function to create a motion vector for motion-adaptive interpolation based on the modified representative motion vector; storage and computation means (100) adapted to input the motion video signal as a unit of a frame to produce a motion video signal shifted by a displacement designated by the motion vector for motion-adaptive interpolation, thus effecting incremental operation of the frame by making use of the displaced motion video signal.

The motion estimation means may have a first function to compute a frequency distribution of each of the original motion vectors from the motion vector detector means, a second function to evaluate a representative motion vector representative of motion of the moving object from the frequency distribution of the original motion vectors, and a third function to implement a modification of the representative motion vector such that a variation of the representative motion vector at a present frame period with respect to the representative motion vector at a previous frame period is limited to a predetermined range, and a fourth function to create a motion vector for motion-adaptive interpolation based on the modified representative motion vector.

The first function of the motion estimation means may comprise a function of computing a first frequency distribution of said motion vectors at a present frame period, a function of computing a first frequency distribution of said motion vectors at a present frame period, a function of computing a second frequency distribution of said motion vectors at a previous frame period and a function of computing linear combinations of said first and second frequency distributions with respect to each component, and the second function may comprise a function of evaluating a representative motion vector representative of motion of said moving object from said third frequency distribution of said original motion vectors.

The motion estimation means (16) may comprise: control signal generator means (20) responsive to information indicative of frame number incremental rate to produce information indicative of the coefficient for motion-adaptive interpolation and timing information for a read and a write signal; motion vector memory means (21) accessible in accordance with the timing information; comparator means (22) operative to compare the original motion vector with a previous motion vector read from the motion vector memory means to produce the compared result as a correction vector; adder means (24) operative to add the correction vector to a motion vector from the motion vector memory means which is delayed by a predetermined time to produce a resultant output; frequency distribution computation means (32A) operative to evaluate an occurrence frequency distribution of each of the resultant output from the adder means; second comparator means (34A) operative to detect the highest occurrence frequency motion vector from the occurrence frequency distribution evaluated in the frequency distribution computation means to output it as a representative motion vector; absolute value computation means (31A) for computing the absolute value of the original motion vector to produce moving area information; moving area memory means (35A) accessible in accordance with said timing information to store the moving area information from the computation means therein; vector memory means (49) for storing the representative motion vector from the second comparator means to read it therefrom in accordance with the logical state of the moving area information, and correlation means (26) operative to correlate the representative motion vector read from the vector memory means with the information indicative of coefficient for motion-adaptive interpolation to produce the motion vector for motion-adaptive interpolation.

The absolute value computation means may be comprised of a norm computation ciruit for computing the norm of the original motion vector to produce moving area information of binary nature dependig upon the magnitude of the normed motion vector.

The information indicative of coefficient for motion-adaptive interpolation may be information indicative of coefficient for division, and the correlation means may be comprised of a divider circuit operative to divide said representative motion vector read from said vector memory by said information indicative of coefficient for division.

The motion estimation means (16) may comprise: control signal generator means (30) responsive to information indicative of frame incremental rate to produce information indicative of the coefficient for motion-adaptive interpolation and timing information for a read and a write signal; absolute value computation means (31B) for computing the absolute value of the original motion vector to produce moving area information; moving area memory means (35B) accessible in accordance with the timing information from the control signal generator means to produce the moving area information stored therein; frequency distribution computation means (32B) operative to compute occurrence frequency distribution of each of the original motion vectors in accordance with the timing information from the control signal generator means and to apply a correction operation to the computed occurrence frequency distribution to perform a linear combination of both the frequency distributions, thus producing a corrected occurrence frequency distribution; comparator means (34B) operative to detect the highest occurrence frequency motion vector from the corrected occurrence frequency distriburion from the occurrence frequency computation means to output it as a representative motion vector; multiplier means (36) operative to multiply the representative motion vector by the moving area information; and correlation means (37) operative to correlate the representative motion vector read from the vector memory means with the information indicative of coefficient for motion-adaptive interpolation to produce the motion vector for motion-adaptive interpolation.

The motion estimation means may comprise: control signal generator means (40) responsive to the information indicative of frame number incremental rate to produce information indicative of coefficient for motion-adaptive interpolation and timing information, absolute value computation means (41) for the absolute value of the original motion vector to produce moving area information, moving area means (42) accessible in accordance with the timing information from the control signal generator means to produce the moving area information stored therein, frequency distribution computation means (43) operative to compute occurrence frequency distribution of each of the original motion vectors in accordance with said timing information from the control signal generator means, first comparator means (44) operative to detect the highest occurrence frequency motion vector from the occurrence frequency distribution from the occurrence frequency computation means to output it as a representative motion vector, memory means (45) for storing the representative motion vector from the first comparator means, second comparator means (46) operative to compare the representative motion vector from the first comparator means with a previous representative motion vector from the memory means to produce the result as a correction vector of which magnitude having a predetermined upper limit, adder means (48) for adding the corrected vector from the second comparator to the previous representative motion vector which has been delayed to produce the added result as a motion vector for interpolation, vector memeory means (49) for storing the motion vector for interpolation to output it when the moving area binary information is in one state, and correlation means (50) operative to correlate the representative motion vector read from the vector memory means with the information indicative of coefficient for motion-adaptive interpolation to produce the motion vector for motion-adaptive interpolation.

BRIEF DESCRIPTION OF THE DRAWINGS

The features and advantages of a motion-adaptive interpolation method and a device implementing the same according to the present invention will become more apparent from the following description taken in conjunction with the accompanying drawings, in which.

DETAILED DESCRIPTION OF THE INVENTION

Principle of the Invention

First, a motion vector detection method will be described. The present invention can employ a detection method based on a unit of block or a unit of picture element. As a first step, a motion vector (an original motion vector) is computed between successive two frames with respect to a picture element or a block etc. within an object frame. Second is to carry out a comparative judgement of the original motion vector with each component of a motion vector which has been computed in advance and stored with respect to a picture element or a block located at the same position within a frame previous with respect to time. As a result of the comparative judgement, when the original motion vector within the object frame is larger (or smaller) than the previous motion vector, a modification is carried out by adding (or subtracting) a constant value to (or from) the previous motion vector stored. Then, the motion vector thus modified is outputted and stored as a motion vector for a picture element or a block within a new object frame. The above-mentioned operation is implemented with respect to the entire picture elements or blocks within the concerned frame to repeatedly carry out this operation with respect to successive frames.

Further, another detection method may be used. A representative motion vector (an original representative motion vector) is evaluated based on a distribution of the group of original motion vectors which have been obtained with respect to a block etc. in a moving area within the object frame. In a manner similar to the first-mentioned method, second is to carry out a comparative judgement of the original representative motion vector thus evaluated with a representative motion vector in an object moving area within a previous frame stored. As a result of the comparative judgement, when the original representative motion vector is larger (or smaller) than the stored representative motion vector within the previous frame, a modification is carried out by adding (or subtracting) a constant value to (or from) the representative motion vector within the previous frame stored. The representative motion vector thus modified is newly stored as a representative motion vector within the object frame. The motion-adaptive interpolation scheme employed in the present invention is based on the detection of the representative motion vector.

A motion vector for a block etc. or a representative motion vector in a moving area obtained with the above-mentioned methods is such that changes produced according as time elapses is limited to a predetermined value. Namely, since such a vector can vary gradually with respect to time, it can approximate the actual motion of a moving object to an excellent degree. Further, a frame synthesis method using such a motion vector or a representative motion vector, i.e., a motion-adaptive interpolation method may be based on the same scheme as that of the conventional ones. For instance, when doubling the number of frames per unit of time as in the system disclosed in Japanese Patent Application No. 57-073134, a motion vector obtained as a unit of block by making use of frames adjacent to a frame to be synthesized is multiplied by one-half (the frame to be synthesized is approximated as an intermediate frame between frames adjacent thereto). The motion vector thus obtained is assigned to an object block located at the same position within the frame to be synthesized. An interpolated picture signal for the object block can be obtained as a picture signal for a block within a previous frame designated by the motion vector multiplied by one-half with the position of the object block being as a reference.

A further method of determining a representative motion vector will be described. A two-dimensional occurrence frequency distribution of motion vectors obtained as unit of block or unit of picture element with respect to a moving area within a current or present frame is computed. Then, a second two-dimensional occurrence frequency distribution of motion vectors obtained in respect to a moving area within a previous frame in a manner similar to the above is also computed. A computation of a linear sum of occurrence frequencies with respect to respective corresponding (X, Y) components is carried out on the basis of the above-mentioned first and second distributions to newly compute a third occurrence frequency distribution based on the linear sum of the occurrence frequencies thus obtained. By way of example, frequency distributions obtained in respect to the previous and present frames are multiplied by one-half, respectively, to compute a sum of occurrence frequencies in respect to respective components. The third frequency distribution thus obtained may be stored to utilize it at a time period of the subsequent frame as a frequency distribution of a motion vector with respect to a previous frame. Then, a representative motion vector which is representative of a moving area is evaluated based on the third frequency distribution. A motion vector which is the highest occurrence frequency vector may be used as an example of method of estimating a representative motion vector. A synthesis method for a frame to be interpolated after the computation of the representative motion vector is completed may be the same as the previously-mentioned method.

PREFERRED EMBODIMENTS

Figure 2:
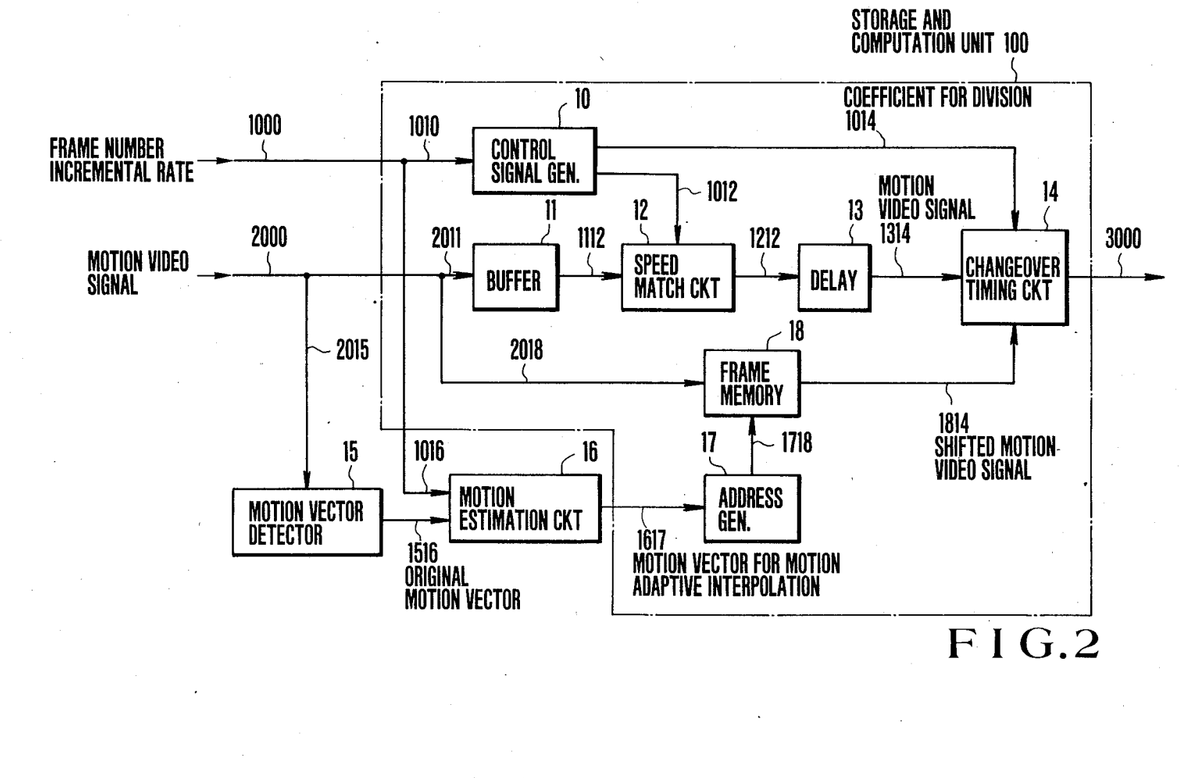
FIG. 2 is a circuit arrangement showing a motion-adaptive circuit for increasing the number of frame.
Figure 3A:
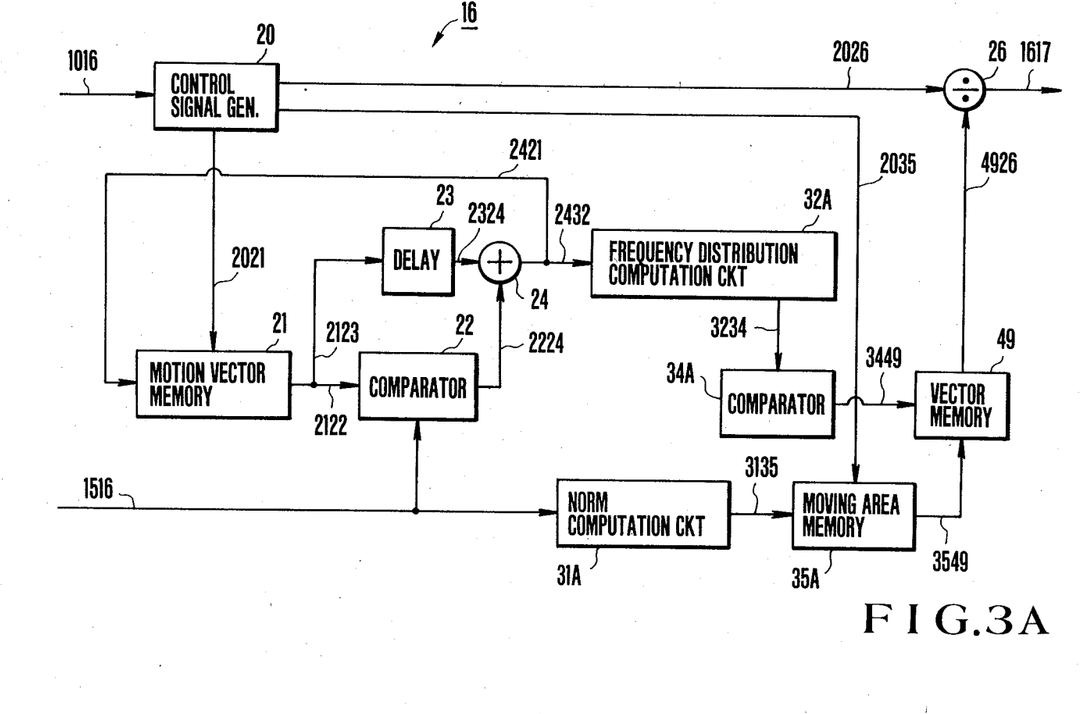
FIGS. 3A to 3C are cirucit arrangement showing embodiments of a motion estimation circuit shown in FIG. 2, respectively.
Figure 3B:
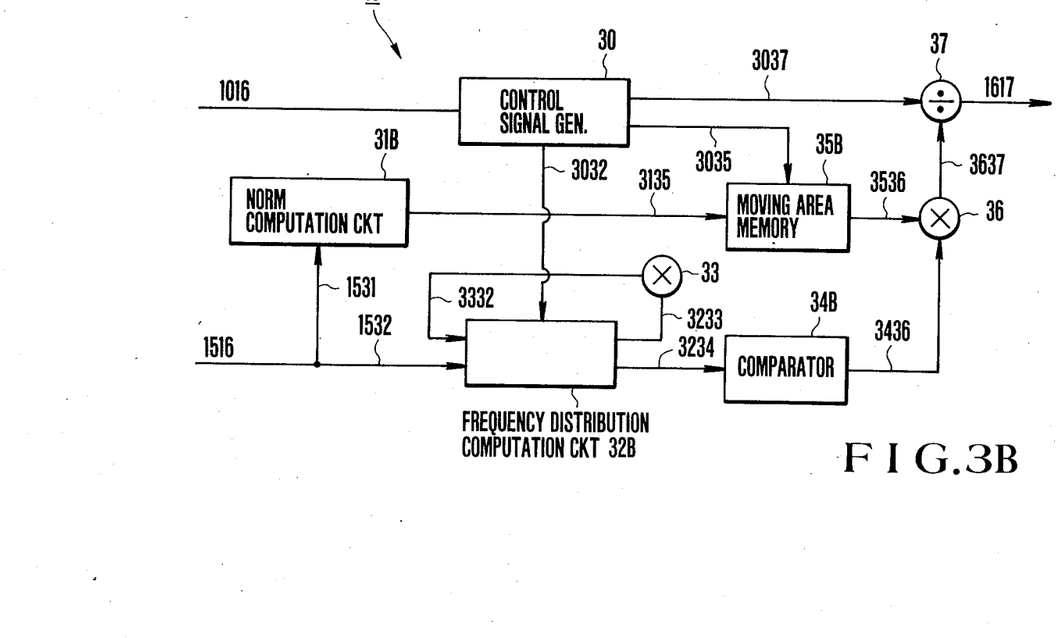
Figure 3C:
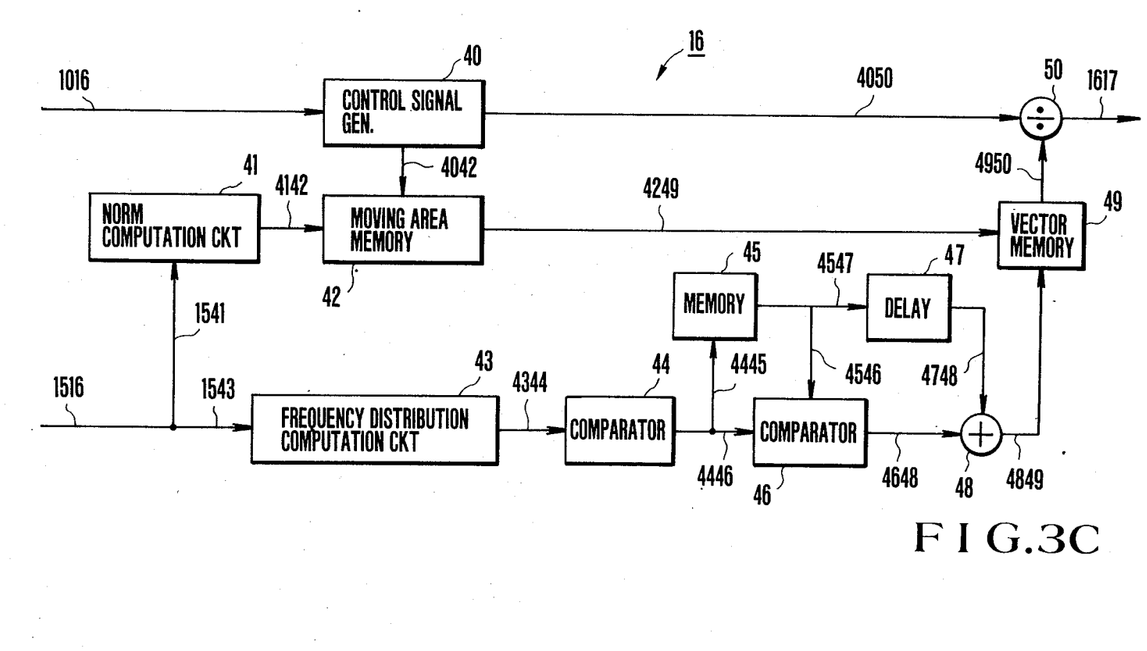

FIG. 2 shows an example of a motion-adaptive interpolation device, i.e., a device for increasing the number of frames to which the present invention is applied. FIGS. 3A to 3C are circuit arrangements illustrating detailed embodiments of a motion estimation circuit 15 shown in FIG. 2, respectively.

An input motion video signal supplied via a line 2000 is delivered to a motion vector detection circuit 15 via a line 2015, also to a buffer memory 11 via a line 2011 and further to a frame memory 18 via a line 2018.

The motion vector detection circuit 15 is provided for detecting an original motion as unit of block or as unit of each picture element based on the motion video signal supplied via the line 2015 to output the original motion vector thus detected to motion estimation circuit referred to soon via a line 1516. Such a detection circuit 15 may be configured by e.g. a motion vector detection circuit described in a published paper entitled "Motion correction in interframe coding", Image Technical Study section, Electrocommunication Society, May 1978 by NINOMIYA. The motion estimation circuit 16 which is considered essential to the present invention is operative to evaluate a motion vector for motion-adaptive interpolation on the basis of the original motion vector supplied via the line 1516 and information as to what times the number of frames as unit of time designated via a line 1016 should be determined (frame number incremental rate) to output the motion vector thus evaluated on a line 1617. Details of the motion estimation circuit 16 will be described later with reference to FIGS. 3A to 3C. An address generator 17 is responsive to the motion vector for motion-adaptive interpolation supplied via the line 1617 to generate a read address for the frame memory 18 to output it on a line 1718. The frame memory 18 is operative to store the motion video signal supplied via lines 2000 and 2018 by a volume substantially corresponding to one frame to output a motion video signal which is shifted by the amount of a displacement designated by the motion vector for motion-adaptive interpolation in accordance with the read address supplied via the line 1718. A control signal generator 10 is operative to output a signal indicative of scanning speed on a line 1012 and a changeover timing signal on a line 1014 in accordance with the information indicative of the frame number incremental rate supplied via the lines 1000 and 1010. The buffer memory 11 has a memory capacity sufficient to effect storage of more than one frame of the original motion video signal supplied via the lines 2000 and 2011 to output the storage contents i.e. the stored original motion video signal on a line 1112. A scanning speed conversion circuit 12 is operative to read out the stored original motion video signal delivered via the line 1112 at a speed corresponding to the number of frames to be increased in accordance with the signal indicative of scanning speed supplied via the line 1012 to output the original motion video signal thus read to a time delay circuit 13 via line 1212. The time delay circuit 13 is operative to effect a time matching such that the original motion video signal has an appropriate phase relationship with respect to the motion-adaptive interpolation picture signal to output the time-matched original motion picture signal on a line 1314. A changeover circuit 14 is operative to effect selective operation of the original motion video signal, scanning speed of which has been converted, supplied via the line 1314 and the motion-adaptive interpolation picture signal supplied via the line 1814 in accordance with a changeover timing signal supplied via the line 1014. For instance, when the changeover timing corresponds to $F_1$ to $F_4$ shown in FIG. 1, the changeover circuit 14 is operative to select the time-matched original motion picture signal via the line 1314, while when it corresponds to a frame synthesized between $F_1$ and $F_2$, between $F_2$ and $F_3$ and betwwen $F_3$ and $F_4$, the changeover circuit 14 selects the motion-adaptive interpolation picture signal via the line 1814, thus to output a motion video signal, the frame number of which is increased, on a line 3000. Reference numeral 100 denotes a storage and computation unit responsive to information indicative of frame number incremental rate, the motion video signal and the output from the motion estimation circuit 16.

The motion estimation circuit 16 which is considered essential to the present invention will be described in connection with three embodiments shown in FIGS. 3A to 3C.

Initially, a first embodiment of the motion estimation circuit will be explained with reference to FIG. 3A.

A control signal generator 20 is operative to output a signal indicative of coefficient for division on a line 2016 in accordance with information indicative of a frame number incremental rate supplied via the line 1016, and to output a read/write timing signal to a motion vector memory and a normed motion vector memory, which will be described later, via lines 2021 and 2035. The motion vector memory 21 is accessed in accordance with the read/write timing signal supplied via the line to write thereinto a motion vector supplied via a line 2421 by a volume corresponding to one frame and read the stored motion vector therefrom on lines 2122 and 2123. A comparator 22 is operative to compare an original motion vector supplied via the line 1516 with a motion vector before one time slot (one frame time period, or a frame time period transmitted) to output its compared result on a line 2224 as a correction vector having an upper limit in the magnitude of the norm or X- and Y-components. A time delay circuit 23 is operative to delay the motion vector supplied via the line 2123 by a time necessary for computation in the comparator 22 to output the delayed motion vector on a line 2324. An adder circuit 24 is operative to add the motion vector supplied via the line 2324 to the correction vector supplied via the line 2224 to output a resultant signal obtained by addition to a frequency distribution computation circuit 32A and also output it on the feedback line 2421. The frequency distribution computation circuit 32A comprises a plurality of counters of which the number corresponds to the kinds of motion vectors which can occur within a detection range of the motion vector. This computation circuit 32A is operative to compute an occurrence frequency distribution of each motion vector corresponding to one frame by making use of a counter corresponding to a motion vector supplied via the line 2432 to output the occurrence frequency distribution thus computed to a comparator 34 through line 3234. The comparator 34 is operative to detect a motion vector which has the highest occurrence frequency in the above mentioned occurrence frequency distribution to output it on a line 3449 as a representative motion vector. A norm or an absolute value computation circuit 31A is operative to compute a norm of the motion vector supplied via the line 1516 to output on a line 3135 as moving area information a "0" when the result is less than a predetermined threshold level and a "1" when otherwise. The moving area memory 35A is accessed in accordance with th timing information supplied via the line 3135 to write thereinto the moving area information supplied via the line 3135 and read it therefrom to a vector memory 49 via a line 3549. The vector memory 49 is operative to store the representative motion vector supplied via the line 3449 to output it on a line 4926 when the motion area information supplied via the line 3549 is "1". A dividing circuit 26 is operative to perform divisional operation of the representative motion vector supplied via the line 4926 in accordance with the information indicative of coefficient for division supplied via the line 2026 to output it on a line 1617 as a motion vector for interpolation.

A second embodiment of the motion estimation circuit will be described with reference to FIG. 3B.

A control signal generator 30 is operative to output a read/write timing signal on lines 3032 and 3035 and to output information indicative of coefficient for division on a line 3037 in accordance with information indicative of frame number incremental rate supplied via the line 1016. A norm computation circuit 31B is operative to compute a norm of a motion vector supplied via lines 1516 and 1531 to output on the line 3135 as moving area information a "0" when the result is less than a predetermined threshold level and a "1" when otherwise. A moving area memory 35B is accessed in accordance with the timing information supplied via the line 3035 to write thereinto the moving area information supplied via the line 3135 by a volume corresponding to one frame and read it therefrom on a line 3536. A frequency distribution computing circuit 32B comprises a plurality of counters of which the number corresponds to several kinds of motion vectors which can occur within a motion vector detection range. The frequency distribution computing circuit 32B is operative to effect a count operation by making use of counters corresponding to motion vectors supplied via lines 1516 and 1532 in accordance with the timing information supplied via the line 3032 to compute an occurrence frequency distribution of each motion vector corresponding to one frame, thereafter to add it to a correction value due to a frequency distribution of a previous time slot supplied via a line 3332 to output it on lines 3234 and 3233. A multiplier 33 is operative to multiply a frequency distribution which has been computed at the previous time slot supplied via the line 3233 by a positive constant which is generally smaller 1 (one) to output a value thus multiplied on the line 3332. A comparator 34B is operative to select a frequency distribution which has the highest occurrence frequency from frequency distributions supplied via the line 3234 to output it on a line 3436 while holding it for a required time as a representative motion vector for motion-adaptive interpolation. A multiplier 36 is operative to multiply the representative motion vector supplied via the line 3436 by moving area information ("0" or "1") supplied via the line 3536 to output a value thus multiplied on a line 3637. A divider 37 is operative to divide a motion vector for interpolation supplied via a line 3637 in accordance with information indicative of coefficient for division supplied via the line 3037 to output a value thus divided on the line 1617.

Finally, a third embodiment of the motion estimation circuit will be described.

A control signal generator 40 is operative to output information indicative of coefficient for division on a line 4050 and a read/write timing signal on a line 4042 in accordance with information indicative of frame incremental rate supplied via the line 1016. A norm computation circuit 41 is operative to calculate a norm of a motion vector supplied via lines 1516 and 1541 to output on a line 4142 a "0" when the result thus obtained is less than a predetermined threshold level and a "1" when otherwise. A moving area memory 42 is accessed in accordance with the timing information supplied via the line 4042 to write thereinto moving area information ("0" or "1") corresponding to one frame via the line 4142 and read it therefrom on a line 4249. A frequency distribution computation circuit 43 comprises a plurality of counters of which the number corresponds to the kinds of motion vectors which can occur within a motion vector detection range. The frequency distribution computing circuit 43 is operative to compute a frequency distribution of a motion vector corresponding to one frame supplied via lines 1516 and 1543 to output the frequency distribution thus computed to a comparator 44 via a line 4344. The comparator 44 is operative to detect the highest frequency distribution to output a corresponding motion vector as a representative motion vector on lines 4446 and 4445. A memory circuit 45 is operative to store the representative motion vector supplied via the line 4445 to output stored contents on lines 4547 and 4546. A comparator 46 is operative to compare the representative motion vector supplied via the line 4446 with the representative motion vector before one time slot supplied via the line 4546 to output the result thus compared on a line 4648 as a correction vector having an upper limit in its norm or X- and Y-components. A time delay circuit 47 is operative to delay a representative motion vector before one time slot supplied via a line 4547 by a time required for computation to output a delayed vector on a line 4748. An adder 48 is operative to add the representative motion vector before one time slot supplied via a line 4748 to the correction vector supplied via a line 4648 to output the value thus obtained on a line 4849. A vector memory 49 is operative to store a motion vector for motion-adaptive interpolation supplied via a line 4849 to output on a line 4950 a vector of "1" when the moving area information supplied via a line 4249 is "1" and a vector of "0" when it is "0". A divider 50 is operative to divide a motion vector for motion-adaptive interpolation supplied via a line 4950 in accordance with information indicative of coefficient for division supplied via a line 4050 to output a value thus divided on the line 1617.

As stated above, the present invention can reproduce a motion of a moving object in an interpolated picture obtained more smoothly as compared to the prior art and can reduce occurrence of discontinuity of the interpolated picture based on an erroneous detection of a motion vector, thus providing excellent advantages in improvements in picture quality of the interpolated picture.

What is claimed is:

1. A motion-adaptive interpolation method for a motion video signal, comprising the steps of:
    (a) detecting an n number of motion vectors (n is a positive integer) of a moving object as units of a certain number of picture elements from two successive frames of said motion video signal;
    (b) computing an m number of representative motion vectors (m<n) representative of motion of said moving object by using said n number of motion vectors;
    (c) implementing a modification of said representative vector such that a variation of the representative motion vector at a present frame period with respect to the representative motion vector at a previous frame period is limited to a predetermined range; and
    (d) increasing the number of the frames per unit of time by using said modified representative motion vector.

2. A method as set forth in claim 1, wherein said modification step comprises the steps of:
    (a) executing a comparative judgement of the representative motion vector at the present frame period with the representative motion vector at the previous frame period; and
    (b) executing a modification by adding said representative motion vector at the present frame period to a certain constant or subtracting a certain constant therefrom, thereby creating said modified representative motion vector.

3. A motion-adaptive interpolation method for a motion video signal, comprising the steps of:
    (a) detecting an n number of motion vectors (n is a positive integer) of a moving object as units of a certain number of picture elements from two successive frames of said motion video signal;
    (b) computing a frequency distribution of said n number of motion vectors;
    (c) evaluating an m number of representative motion vectors (m<n) representative of motion of said moving object from said frequency distribution of said n number of said motion vectors;
    (d) implementing a modification of said representative vector such that a variation of the representative motion vector at a present frame period with respect to the representative motion vector at a previous frame period is limited to a predetermined range; and
    (e) increasing the number of the frames per unit of time by using said modified representative motion vector.

4. A method as set forth in claim 3, wherein said computing step comprises:
    (a) computing a first frequency distribution of said n number of motion vectors at a present frame period;
    (b) computing a second frequency distribution of said n number of motion vectors at a previous frame period; and
    (c) computing linear combination of said first and second frequency distributions with respect to each component, and
    said evaluating step comprises evaluating an m number of representative vectors (m<n) representative of motion of said moving object from said third frequency distribution.

5. A device for implementing motion-adaptive interpolation to a motion video signal, comprising:
    (a) motion vector detector means for detecting an original motion vector of a moving object as a unit of a certain number of picture elements from two successive frames of said motion video signal;
    (b) motion estimation means for evaluating an estimated motion of said motion video signal, said motion estimation means having a first function to compute a representative motion vector of said moving object by using each of said original motion vectors sequentially inputted from said motion vector detector means, a second function to implement a modification of said representative motion vector such that a variation of the representative motion vector at a present frame period with respect to the representative motion vector at a previous frame period is limited to a predetermined range, and a third function to create a motion vector for motion-adaptive interpolation based on said modified representative motion vector; and (c) storage and computation means adapted to input said motion video signal as a unit of a frame to produce a motion video signal shifted by a displacement designated by said motion vector for motion-adaptive interpolation, thus effecting incremental operation of the frame by making use of said displaced motion video signal.

6. A device as set forth in claim 5, wherein said second function of said motion estimation means comprises a function of executing a comparative judgement of the representative motion vector at the present frame period with the representative motion vector at the previous frame period.

7. A device for implementing motion-adaptive interpolation to a motion video signal, comprising:
  (a) motion vector detector means for detecting an original motion vector of a moving object as a unit of a certain number of picture elements from two successive frames of said motion video signal;
  (b) motion estimation means for evaluating an estimated motion of said motion video signal, said motion estimation means having a first function to compute a frequency distribution of each of said original motion vectors from said motion vector detector means, a second function to evaluate a representative motion vector representative of motion of said moving object from said frequency distribution of said original motion vectors, and a third function to impelement a modification of said representative motion vector at a present frame period with respect to the representative motion vector at a previous frame period is limited to a predetermined range, and a fourth function to create a motion vector for motion-adaptive interpolation based on said modified representative motion vector; and
  (c) storage and computation means adapted to input said motion video signal as a unit of a frame to produce a motion video signal shifted by a displacement designated by said motion vector for motion-adaptive interpolation, thus effecting incremental operation of the frame by making use of said displaced motion video signal.

8. A device as set forth in claim 7, wherein said first function of said motion estimation means comprises a function of computing a first frequency distribution of said motion vectors at a present frame period, a function of computing a second frequency distribution of said motion vectors at a previous frame period, and a function of computing linear combination of said first and second frequency distributions with respect to each component, and said second function comprises a function of evaluating a representative motion vector representative of motion of said moving object from said third frequency distribution of said original motion vectors.

9. A device as set forth in claim 7, wherein said motion estimation means comprises:

(a) control signal generator means responsive to information indicative of frame number incremental rate to produce information indicative of coefficient for motion-adaptive interpolation and timing information for a read and a write signal;
  (b) motion vector memory means accessible in accordance with said timing information;
  (c) comparator means operative to compare said original motion vector with a previous motion vector read from said motion vector memory means to produce the compared result as a correction vector;
  (d) adder means operative to add said correction vector to a motion vector from said motion vector memory means which is delayed by a predetermined time to produce a resultant output;
  (e) frequency distribution computation means operative to evaluate an occurrence frequency distribution of each of said resultant outputs from said adder means;
  (f) second comparator means operative to detect the highest occurrence frequency motion vector from said occurrence frequency distribution evaluated in said frequency distribution computation means to output it as a representative motion vector;
  (g) absolute value computation means for computing the absolute value of said original motion vector to produce moving area information;
  (h) moving area memory means accessible in accordance with said timing information to store said moving area information from said computation means therein;
  (i) vector memory means for storing said representative motion vector from said second comparator means to read it therefrom in accordance with the logical state of said moving area information; and
  (j) correlation means operative to correlate said representative motion vector read from said vector memory means with said information indicative of coefficient for motion-adaptive interpolation to produce said motion vector for motion-adaptive interpolation.

10. A device as set forth in claim 9, wherein said absolute value computation means is comprised of a norm computation circuit for computing the norm of said original motion vector to produce moving area information of binary nature depending upon the magnitude of said normed motion vector.

11. A device as set forth in claim 9, wherein said information indicative of coefficient for motion-adaptive interpolation produced from said control signal generator means is information indicative of coefficient for division, and said correlation means is comprised of a divider circuit operative to divide said representative motion vector read from said vector memory by said information indicative of coefficient for division.

12. A device as set forth in claim 7, wherein said motion estimation means comprises:
  (a) control signal generator means responsive to information indicative of frame incremental rate to produce information indicative of coefficient for motion-adaptive interpolation and timing information for a read and a write signal;
  (b) absolute value computation means for computing the absolute value of said original motion vector to produce moving area information;
  (c) moving area memory means accessible in accordance with said timing information from said control signal generator means to produce the moving area information stored therein;

(d) frequency distribution computation means operative to compute occurrence frequency distribution of each of said original motion vectors in accordance with said timing information from said control signal generator means and to apply a correction operation to the computed occurrence frequency distribution to perform a linear combination of both said frequency distributions, thus producing a corrected occurrence frequency distribution;

(e) comparator means operative to detect the highest occurrence frequency motion vector from said corrected occurrence frequency distribution from said occurrence frequency computation means to output it as a representative motion vector;

(f) multiplier means operative to multiply said representative motion vector by said moving area information; and (g) correlation means operative to correlate said representative motion vector read from said vector memory means with said information indicative of coefficient for motion-adaptive interpolation to produce said motion vector for motion-adaptive interpolation.

13. A device as set forth in claim 12, wherein said absolute value computation means is comprised of a norm computation circuit for computing the norm of said original motion vector to produce moving area information of binary nature depending upon the magnitude of said normed motion vector.

14. A device as set forth in claim 12, wherein said information indicative of coefficient for motion-adaptive interpolation produced from said control signal generator means is information indicative of coefficient for division, and said correlation means is comprised of a divider circuit operative to divide said representative motion vector read from said vector memory by said information indicative of coefficient for division.

15. A device as set forth in claim 7, wherein said motion estimation means comprises:

(a) control signal generator means responsive to said information indicative of frame number incremental rate to produce information indicative of coefficient for motion-adaptive interpolation and timing information;

(b) absolute value computation means for computing the absolute value of said original motion vector to produce moving area information;

(c) moving area means accessible in accordance with said timing information from said control signal generator means to produce the moving area information stored therein;

(d) frequency distribution computation means operative to compute occurrence frequency distribution of each of said original motion vectors in accordance with said timing information from said control signal generator means;

(e) first comparator means operative to detect the highest occurrence frequency motion vector from said occurrence frequency distribution from said occurrence frequency computation means to output it as a representative motion vector;

(f) memory means for storing said representative motion vector from said first comparator means;

(g) second comparator means operative to compare said representative motion vector from said first comparator means with a previous representative motion vector from said memory means to produce the result as a correction vector of which magnitude having a predetermined upper limit;

(h) adder means for adding said corrected vector from said second comparator to said previous representative motion vector which has been delayed to produce the added result as a motion vector for interpolation;

(i) vector memory means for storing said motion vector for interpolation to output it when said moving area binary information is in one state; and (j) correlation means operative to correlate said representative motion vector read from said vector memory means with said information indicative of coefficient for motion-adaptive interpolation to produce said motion vector for motion-adaptive interpolation.

16. A device as set forth in claim 15, wherein said absolute value computation means is comprised of a norm computation circuit for computing the norm of said original motion vector to produce moving area information of binary nature depending upon the magnitude of said normed motion vector.

17. A device as set forth in claim 15, wherein said information indicative of coefficient for motion-adaptive interpolation produced from said control signal generator means is information indicative of coefficient for division, and said correlation means is comprised of a divider circuit operative to divide said representative motion vector read from said vector memory by said information indicative of coefficient for division.

18. A device as set forth in claim 7, wherein said storage and computation means comprises:

(a) control signal generator means responsive to information indicative of frame number incremental rate to produce a signal indicative of scanning speed and a changeover timing signal;

(b) buffer memory means for storing more than one frame of said original video motion signal;

(c) means for reading said original video motion signal from buffer memory means in accordance with said scanning speed signal from said control means;

(d) address generator means responsive to said motion vector for motion-adaptive interpolation from said motion estimation means to produce address information;

(e) frame memory means for storing said original video motion signal by a volume substantially corresponding to one frame to produce a motion video signal which is shifted by the amount of a displacement designated by said motion vector for motion-adaptive interpolation in accordance with said address information from said address generator means; and (f) changeover circuit for selecting said output from said reading means or said displaced motion video signal from said frame memory means in accordance with said changeover timing signal, thereby producing a motion video signal of which frame numberr is increased.

* * * * *